March 22, 1960    E. STUMP ET AL    2,929,214
HYDRODYNAMIC TORQUE CONVERTER AND BRAKE
Filed June 4, 1954                    2 Sheets-Sheet 2

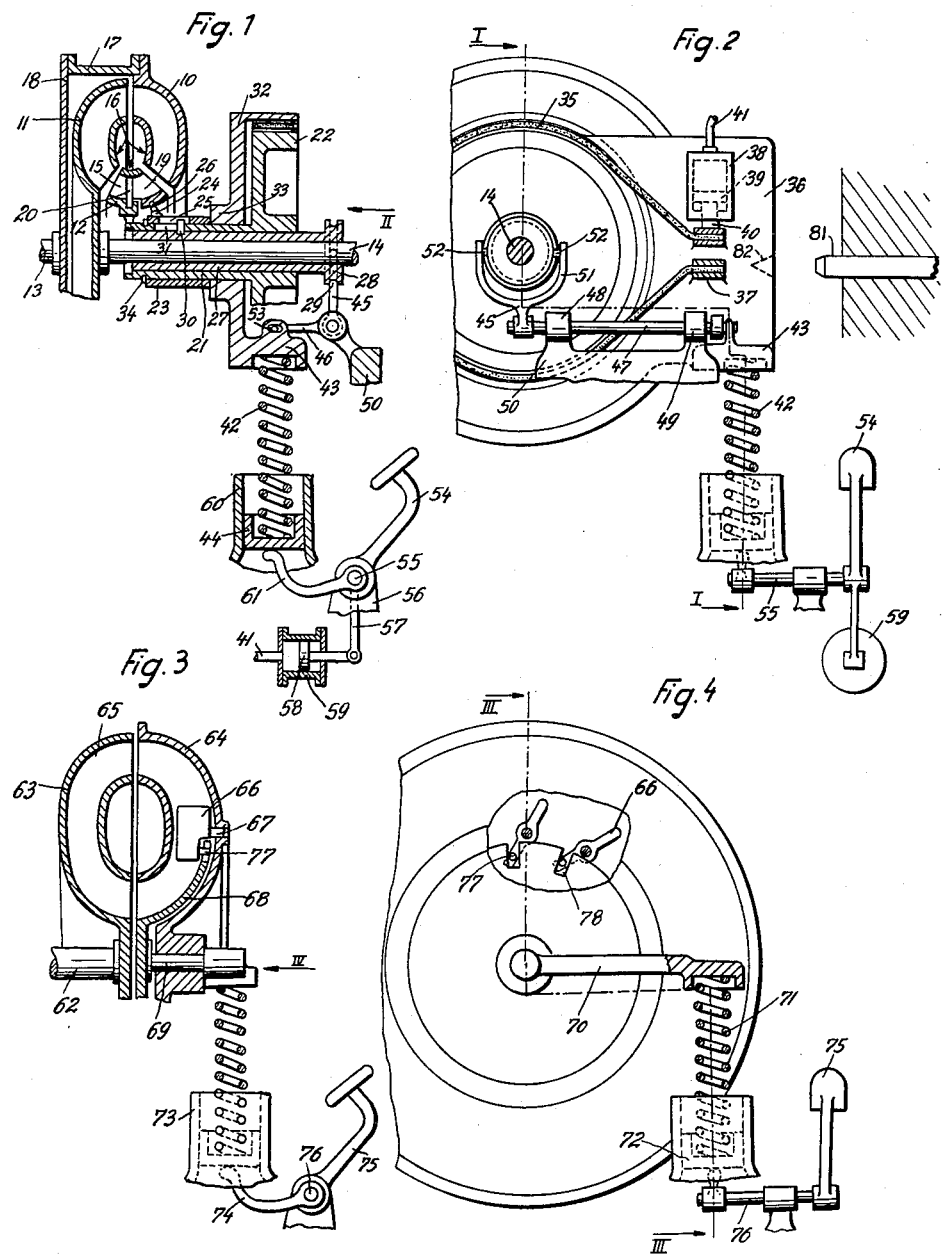

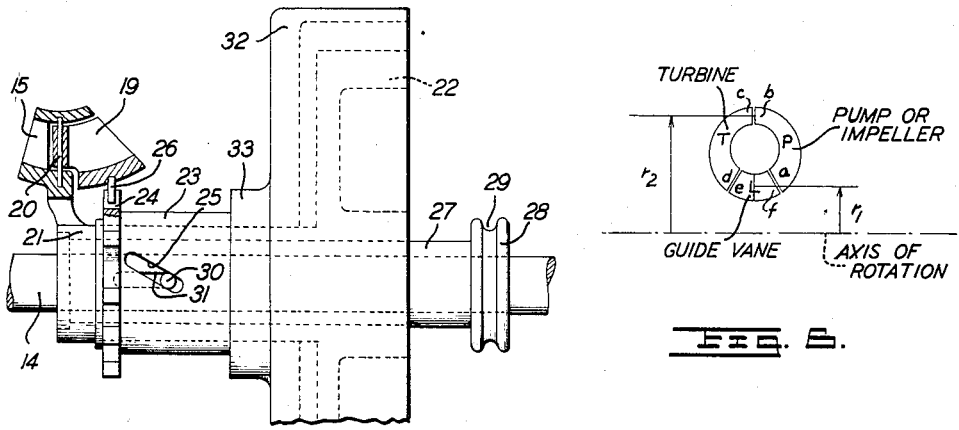

FIG. 5.

FIG. 6.

$$M_P = Q(C_{u_b} \cdot r_2 - C_{u_f} \cdot r_1)$$
$$M_T = Q(C_{u_d} \cdot r_1 - C_{u_b} \cdot r_2)$$
$$M_L = Q(C_{u_f} \cdot r_1 - C_{u_d} \cdot r_1)$$

C = ABSOLUTE VELOCITY.
$C_u$ = CIRCUMFERENTIAL COMPONENT OF ABSOLUTE VELOCITY C.
W = RELATIVE VELOCITY DETERMINED BY VANE DIRECTION.
u = CIRCUMFERENTIAL VELOCITY.
M = COUPLE OR MOMENT.
Q = QUANTITY PER UNIT TIME.

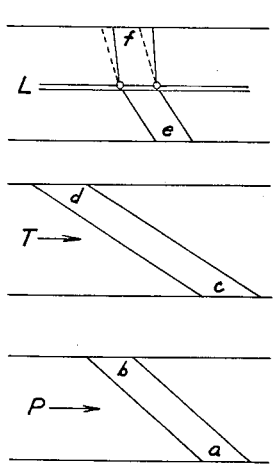

FIG. 7.

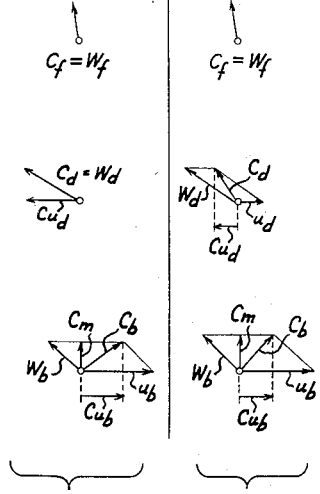

FIG. 7A.    FIG. 7B.    FIG. 7C.    FIG. 7D.

INVENTORS.
EUGEN STUMP
PAUL E. STRIFFLER
BY
Dicke & Craig
ATTORNEYS

United States Patent Office 2,929,214
Patented Mar. 22, 1960

2,929,214

HYDRODYNAMIC TORQUE CONVERTER AND BRAKE

Eugen Stump, Stuttgart-Unterturkheim, and Paul E. Strifler, Kornwestheim, Kr. Ludwigsburg, Germany, assignors to Daimler-Benz Aktiengesellschaft, Stuttgart-Unterturkheim, Germany Application June 4, 1954, Serial No. 434,556

Claims priority, application Germany June 10, 1953

7 Claims. (Cl. 60—54)

Our invention relates to a hydrodynamic brake and, more particularly, to means for the adjustment thereof.

More specifically, the invention is concerned with a hydrodynamic brake of the type provided with a set of adjustable guide vanes and adapted to develop a braking couple which depends on the position of the guide vanes or of parts thereof. The characteristic of a hydrodynamic brake of this type is such that when the rotary speed increases, the braking couple increases proportionally to the square of such rotary speed provided that the position of the adjustable guide vanes is maintained unvaried. If it is desired, however, that the braking couple produced be not proportional to such square, the position of the adjustable guide vanes must be varied as the rotary speed changes. This is particularly true where it is desired to keep the braking couple constant when the rotary speed of the brake shaft varies.

It is the object of the present invention to provide a hydrodynamic brake of the character described in which the position of the guide vanes is automatically varied upon an alteration of the rotary speed.

A further object is to provide controlling means for a hydrodynamic brake permitting automatic varying of the braking couple by adjustment of the position of the guide vanes, such controlling means utilizing the forces exerted by the circulating liquid upon the guide vanes for the purpose of accomplishing the automatic adjustment of the guide vanes.

The present invention is particularly applicable to a hydrodynamic device including a rotary support carrying the guide vanes. When so applied it is a further object to utilize the reaction torque exerted during braking operation by the liquid upon such guide vane support to adjust the guide vanes, and to provide automatic guide vane adjusting means for a hydrodynamic torque converter capable of being operated as a brake, the adjustable guide vanes being operable in a braking operation to influence the braking couple.

Further objects of the invention will appear from a detailed description of two embodiments thereof following hereinafter, it being understood that such detailed description serves the purpose of illustrating the invention rather than that of restricting the same. In the drawings, Fig. 1 is a partial axial section taken through a torque converter connecting a driving shaft with a driven shaft and adapted to be operated as a brake for the driven shaft, the section being taken along the broken line I—I of Fig. 2, Fig. 2 is a side view of the mechanism shown in Fig. 1 viewed in the direction of the arrow II of Fig. 1.

Fig. 3 is an axial section similar to that of Fig. 1 of a hydrodynamic device serving as a brake only, the section being taken along the broken line III—III of Fig. 4, Fig. 4 is a side view of the mechanism shown in Fig. 3 viewed in the direction of the arrow IV of Fig. 3, parts being shown as broken away to expose other parts to view, Figure 5 is an enlarged partial cross-sectional view showing in greater detail the adjusting mechanism for the reaction blades of the hydrodynamic device illustrated in Fig. 1, Figure 6 is a representation of the fluid circulating path through the pump, turbine and guide vanes, Figure 7 represents schematically the inclination of the various vanes, and Figures 7A through 7D show vectors representing forces at the points of transfer of liquid between the pump, turbine and guide vane elements of Figures 6 and 7.

The hydrodynamic device illustrated in Fig. 1 is a torque converter composed of three elements 10, 11 and 12 which are relatively rotatable about the common axis of the driving shaft 13 and the driven shaft 14, the driving element 10 being normally an impeller fixed to the driving shaft 13, the element 11 being normally a turbine or runner fixed to the driven shaft 14, and the third element 12 being a rotary support of a set of guide vanes 15. The three elements 10, 11 and 12 have outer wall portions so shaped as to confine an annular housing and inner wall portions 16 which cooperate to constitute an annular core or torus within the annular housing. The inner wall portions 16 are connected to the outer wall portions of the three elements 10, 11 and 12 by vanes. A body of liquid circulates around the core or torus for impelling engagement with the vanes of the three elements 10, 11 and 12 in a known manner.

In normal operation, the driving shaft 13 is driven by an engine and causes the impeller 10 to act as a pump impelling the body of liquid to circulate around the core or torus 16, the circulating body imparting rotation and delivering energy to the element 11 operative as a turbine and driving shaft 14. The shaft 14 may be geared by an axle transmission to the wheels of a vehicle on which the engine and the hydrodynamic device are mounted.

As described hereinafter, the hydrodynamic device is capable of such operation that free rotation is permitted to the rotary support 12. In that event, the hydrodynamic device acts as a hydrodynamic coupling in which the torque exerted by the engine upon the driving shaft 13 and the impeller 10 is transferred by the circulating body of liquid to the hydrodynamic element 11 and the driven shaft 14. However, the hydrodynamic device is also capable of such an operation in which the rotary support 12 is restrained from rotation. In that event, the guide vanes 15 carried by the support 12 will so direct the circulating liquid as to drive the section 11 acting as a turbine at a lower rotary speed but with a higher torque, as is well known in the art.

When the vehicle is coasting, the element 11 acts as a pump and causes the liquid to circulate to give off its energy to the hydrodynamic element 10 that is fixed to the engine by a drum-shaped housing 17, an end plate 18 and the driving shaft 13. A braking couple may be produced by restraining the rotatable support 12 from rotation and by a suitable adjustment of the guide vanes 15. In this operation, the hydrodynamic element 11 constitutes a fluid-conducting means which is associated with the impeller 10 and conducts the circulating liquid for impelling engagement with the vanes of the impeller 10.

For the purpose of adjustment, the guide vanes 15 have portions 19 which are hinged to be swingable about radial studs 20 fixed to the rotary support 12.

The rotary support 12 is formed by an annular wall member fixed to a hollow shaft 21 surrounding the driven shaft 14 and fixed to a drum-shaped brake member 22. An adjusting member in the form of a sleeve 23 is rotatably mounted on the hollow shaft 21 and provided with external teeth 24 and with a helical cam groove 25. Internal projections 26 of the pivotal vane portions 19 engage between the teeth 24. As a result, a rotary adjustment of sleeve 23 relative to the hollow shaft 21 will rock the vane portions 19 of the vanes 15 about the hinged studs 20 thus bringing the same into the position required to produce the braking couple as above described.

The shafts 14 and 21 are journalled in suitable bearings not shown so as to be secured against longitudinal displacement. A sleeve 27 surrounds shaft 14 inside the hollow shaft 21 and is provided with a collar 28 having a peripheral groove 29 and with a radial stud 30 which extends through a longitudinal slot 31 of the hollow shaft 21 into the cam slot 25 of the sleeve 23. The sleeve 27 is axially shiftable and if so shifted, its stud 30 will produce a relative angular displacement between the hollow shaft 21 and the sleeve 23 and will, therefore, cause adjustment of the guide vanes 19. The movement of the radial stud 30 in the helical cam groove 25 to rotate the teeth 24 is shown perhaps more clearly in Figure 5 where the helical slot is illustrated in a position moved 90° from the illustration of Figure 1.

A swingable member 32 provided with a hub portion 33 is journalled in suitable bearings not shown in coaxial relationship to shaft 14, the hub portion 33 surrounding the hollow shaft 21 in endwise contact with sleeve 23. The hollow shaft 21 is provided with a groove and a split ring 34 therein which engages the other end face of sleeve 23 to thereby hold the same against axial displacement.

The swingable member 32 is provided with a brake member in form of a brake band 35 which may be caused to frictionally engage the periphery of brake member 22 to thereby brake the elements 22 and 32 for common rocking movement. When the brake is so engaged, the hollow shaft 21 and the guide vanes 15, 19 carried thereby are restrained from rotation to produce a braking effect when the vehicle is to be braked.

The swingable member 32 is formed with a plate 36 extending at right angles to shaft 14 and provided with a bracket 37. Moreover, a cylinder 38 is fixed to plate 36, the cylinder having a piston 39 provided with a piston rod 40 which extends out of cylinder 38. One end of the brake band 35 is fixed to bracket 37 and the other end is fixed to the piston rod 40. When a liquid under pressure is admitted through a pipe 41 into the top of the cylinder 38, the piston 39 is depressed and will thereby tension the brake band 35 which frictionally engages brake member 22 thus coupling the elements 22 and 32 together for common rocking motion.

Means are provided to resiliently restrain the swingable member 32 against rotation. To this end, a spring 42 is so mounted between a projection 43 of member 32 and an anvil 44 carried by the chassis of the vehicle as to brace the swingable member 32, 36 against the reactionary couple which is exerted by the impelled liquid upon the guide vanes 15, 19, the supporting member 12, the hollow shaft 21 and the brake member 22 and is transferred by the engaged brake to the swingable member 32, 36.

For the purpose of the automatic adjustment of the guide vanes 15, 19 in dependence on such reactionary force, the sleeve 27 which is connected with the adjusting member 23 for adjustment of the guide vanes 15, 19 is actuated by the swingable member 32 through the intermediary of a bell crank. This bell crank is formed by arms 45 and 46 of a shaft 47 mounted in journals 48 and 49 fixed to a bracket 50 that is suitably attached to the chassis of the vehicle. The arm 45 is provided with a yoke 51 having a pair of opposed studs 52 which engage the peripheral groove 29 of collar 28. Therefore, pivotal motion of the bell crank 45, 46 will axially shift the sleeve 27 and thereby vary the adjustment of the guide vanes 15, 19.

The horizontal arm 46 extending from shaft 47 to the left with reference to Fig. 1 engages a horizontal slot 53 provided in the projection 43 of the swingable member 32, 36. Therefore, the bell crank 45, 46 constitutes an element which is actuated by the swingable member 32, 36 and is cooperatively connected with the adjusting member 23 for adjustment of the guide vanes under the effect of the forces exerted by the circulating liquid upon the guide vanes.

The entire train of elements 23, 30, 27, 45, 46 and 32 forms in effect adjusting means associated with the guide vanes 15, 19 to be responsive to the forces exerted thereupon by the circulating liquid, such adjusting means being adapted to adjust the guide vanes.

In order to enable the driver to condition the rotary support 12 of the guide vanes 15, 19 for free rotation as is desired during normal driving conditions when the hydrodynamic device is to act as a hydrodynamic coupling, we have provided an optionally operable member for rendering the adjusting means just described active or inactive. In the embodiment shown, such optionally operable member is formed by a pedal 54 pivotally fixed to a horizontal shaft 55 journalled in a bracket 56 attached to the chassis (Fig. 1). Shaft 55 has a depending arm 57 which is connected with a piston 58 movable in a cylinder 59 mounted on the chassis. The cylinder 59 is connected to the pipe 41 which is suitably connected to a source of liquid by a check valve not shown. Therefore, pressure exerted upon the pedal 54 will cause the piston 58 to feed liquid through pipe 41 into the top of cylinder 38 to thereby engage the brake. Such engagement will render the adjusting means effective for the automatic adjustment of the guide vanes in dependence on the reactionary couple exerted by the liquid upon the rotary support 12. When the driver releases the pedal 54, however, the piston 39 will be relieved from fluid pressure and will relax brake band 35 to thereby disengage the clutch thus permitting the hollow shaft 21 and the guide vane support 12 to freely revolve. Under such conditions, the guide vanes 15, 19 are capable of self-adjustment within the circulating liquid and the hydrodynamic device will act as a hydrodynamic coupling.

The optionally operable member 54 is preferably adapted to bias the spring 42 in dependence on its operation so as to enable the driver to influence the automatic adjustment of the guide vanes and to thereby alter the braking couple produced. To this end, the anvil 44 is slidable in guideways 60 fixed to the chassis towards and away from the projection 43 and rests upon an arm 61 of shaft 55. Depression of pedal 54 will thereby increase the bias of spring 42 and thus alter the angular adjustment of the relatively braked members 22 and 32.

Servomotor means 58—59 are provided which may be operated by the driver to supply liquid under pressure to pipe 41 for engagement of the friction brake and any conventional arresting means, such as a pin 81 actuated in any suitable manner to engage a recess 82 of appropriate shape in plate 36 may be provided to arrest the swingable member 32, 36 in a position in which it adjusts the guide vanes 15, 19 to the position required for operation of the hydrodynamic device as a torque converter. Therefore, when an increased driving torque is required for starting the vehicle or for driving uphill, the driver may thus operate the device as a torque converter.

In order to better explain the braking function of the device, let it be assumed that the vehicle is being driven downhill and that the driver has depressed the brake pedal 54 a certain amount, and that the braking couple thus produced suffices to keep the speed of the vehicle constant. The reactionary torque acting on the guide vanes 15, 19 and transferred to the guide vane support 12 is further transferred by the brake 22, 35 to the swingable member 32, 36 which is braced against the chassis of the vehicle by the helical spring 42.

Should the speed of the vehicle increase owing to an increasing downgrade of the road, the reactionary torque exerted upon the guide vane support 12 will increase substantially in proportion to the square of the speed in accordance with the characteristic of such hydrodynamic devices. The spring 42 will be further compressed by a corresponding amount permitting an additional rocking motion of plate 36. As a result, the bell crank 45, 46, will be rocked shifting sleeve 27 to the left with reference to Fig. 1. This causes an adjustment of the guide vane portions 19 whereby a new condition of balance will be reached in which notwithstanding the increased rotary speed of the hydrodynamic element 11 the braking couple will have increased less than the square of the speed and may have been kept constant, provided that the ratio of transmission between the vanes 15, 19 and the rocking member 32, 36 has been chosen accordingly.

When the driver wishes to increase the braking couple, he will further depress the pedal 54 whereby the anvil 44 will be raised thereby rocking plate 36 upwardly. Such rocking motion is transferred to the guide vanes and causes the same to produce a more powerful braking couple.

To explain the operation of the embodiment of Figures 1, 2 and 5 under different operating conditions, reference may be had to Figure 6 which shows the pump or impeller P, the turbine T and the guide vanes L in their respective positions spaced from a rotational axis corresponding to the axis of the shafts 13 and 14. Through the elements P, T and L, the liquid circulates in the path $a$, $b$, $c$, $d$, $e$ and $f$ indicated by the arrows.

There is also indicated at Figure 7 the moments acting on the pump, turbine and guide vanes, indicated by the equations for $M_P$, $M_T$ and $M_L$, respectively. The variables in these equations are also indicated at Figure 7 and the radii $r_1$ and $r_2$ shown in Figure 6. For purposes of this explanation, $r_1$ may be considered as the moment arm for computing the moments at points $d$, $e$, $f$, and $a$ in the equations for $M_P$, $M_T$ and $M_L$.

In Figure 7, there are schematically illustrated the vanes of the elements P, T and L having inlets $a$, $c$ and $e$ and outlets $b$, $d$ and $f$, respectively.

Figures 7A and 7B show vectors representing conditions in which the device is acting as a torque converter with the engine and impeller P rotating at constant speed, but with the turbine stationary for Figure 7A and rotating in accordance with some vehicle speed for Figure 7B. For both Figures 7A and 7B, it may be assumed that the adjustable guide vanes are in the same position.

The vectors in Figures 7C and 7D represent forces of fluid flow in the device for conditions of strong and relatively weaker braking respectively, but with the turbine rotating at constant speed. The Figures 7C and 7D merely represent how the change in position of the guide vanes 19 may change the braking characteristics.

Operation for Figure 7A

With the vehicle engine running to rotate and the vehicle stopped so that turbine T does not rotate, the meridional flow velocity $C_m$ in the direction of the arrows in the circuit $a$—$b$—$c$—$d$—$e$—$f$ is determined by the pump P. The circumferential flow velocity in the pump exit at $b$ is $U_b$, corresponding to the rotational speed of the engine. The value and direction of the absolute velocity $C_b$ at this point may be considered as the resultant of $U_b$ and the relative velocity $W_b$ or, as the resultant of $C_m$ and $Cu_b$, the latter being the circumferential component of the absolute velocity $C_b$.

At the turbine exit $d$ the absolute velocity $C_d$ also corresponds to the relative velocity $W_d$ since the turbine is stationary. Under this operating condition the starting torque is relatively large, as may be determined from the equation of $M_T$ by considering the circumferential components $Cu_d$ of $C_d$ and $Cu_b$ together with the respective radii $r_2$ and $r_1$.

For the purposes of this explanation, $r_1$ may be considered the moment arms for computing the moments at points $d$, $e$, $f$, $a$ in the equations for $M_P$, $M_T$ and $M_L$ representing the couple or moment on the pump, turbine and guide vanes, respectively.

Operation for Figure 7B

Under this condition the vehicle is being driven with the pump P rotating at the same speed as in condition A above, but with turbine T rotating at a speed corresponding to some vehicle speed. The meridional velocity $C_m$ has increased slightly because the turbine blades are so arranged that, considered by themselves, they permit an increased draw of liquid from $c$ to $d$ because of the increased turbine speed. Whereas the circumferential velocity $U_d$ was zero under condition A, this velocity $U_d$ under condition B combines with $W_d$ to swing to the right the absolute velocity $C_d$ which now has a smaller circumferential component $Cu_d$. $Cu_b$ is also changed by the change in $C_m$. Accordingly, the moment $M_T$ becomes smaller. The turbine adjusts itself to such a speed that the moment absorbed by the turbine which corresponds to that of equation $M_T$ is equal to the torque of the driving resistance at the shaft 14.

Operation for Figure 7C

For brake operation with stronger braking, the adjustable guide vanes may be in the position represented by dotted lines in Figure 7. If it is assumed that the vehicle drives rapidly downhill, the circumferential velocity $U_d$ is relatively large while the velocity $U_b$ is relatively slight due to the entraining of the pump P by the engine as the latter applies a braking force. The turbine is, therefore, braked with a moment equal to $M_T$ dependent on the circumferential velocity component $Cu_d$ and $Cu_b$ as indicated in the equation for $M_T$. These components are illustrated in Figure 7C. It should also be noted that the vector $C_d$ is displaced to the right compared to the narrow $C_b$, the reverse being true in Figure 7A and 7B.

Operation for Figure 7D

For brake operation at the same turbine speed but with relatively weaker braking, the adjustable guide vanes L are displaced into the direction shown in full lines in Figure 7. The vector $C_f$ is moved toward the right correspondingly, and this would ordinarily mean that the moment $M_P$ absorbed by the pump has to increase because $Cu_f$ had decreased. The pump P, which is connected with the engine, however, cannot absorb a larger moment as the latter is determined by the moment necessary to rotate the engine. Consequently, the pump P has to run faster so that $U_b$ in this operating condition is larger than $U_b$ of the operating condition for Figure 7C. In that manner, $Cu_b$ also becomes smaller as seen in the drawing and $M_P$ may remain constant. By comparison of the velocities $C_d$ and $C_b$ in the operating conditions for Figures 7C and 7B, it may be readily seen that the braking moment $M_T$ for Figure 7D has become smaller.

From the foregoing analysis of Figures 7C and 7D, it may be seen that the braking couple $M_T$ may be varied by adjusting the guide vanes L. In accordance with this invention, this adjustment of the guide vanes by the mechanism referred to heretofore automatically effects with increases in rotational speed braking moments that are progressively relatively less than would be produced with an increase in rotational speed with no adjustment of the guide vanes.

In the embodiment illustrated in Fig. 3, the shaft 62 which is to be braked is rigidly connected with an impeller 63. Fluid-conducting means in form of a stationary housing 64 are associated with the impeller 63 and adapted to conduct a circulating liquid for impelling engagement with vanes 65 provided on the impeller 63. A set of guide vanes 66 is provided, each guide vane being pivotally mounted in engagement with the circulating liquid for adjustment of the braking couple exerted by said liquid upon the impeller 63. More particularly, each vane has a pivot pin 67 which is journalled in a bore of housing 64. Adjusting means are associated with the guide vanes 66. In the embodiment shown, such adjusting means comprise an annulus 68 which is fixed to an adjusting member in form of a shaft 69. This shaft is mounted coaxially with shaft 62 and has an arm 70 which is braced against the chassis by a helical spring 71. The spring 71 rests on an anvil 72 which is mounted in guideways 73 for vertical adjustment and rests on an arm 74 of a pedal 75, the latter being carried by a rotary shaft 76.

Each of the vanes 66 has a stud 77 engaging a radial slot 78 of the annulus 68.

A component of the forces exerted by the circulating liquid upon the guide vanes 66 will be taken up by the adjusting means 68, 69 and 70. When the rotary speed of shaft 62 increases during the braking action, the force exerted by the circulating liquid upon the guide vanes and the consequent braking couple will likewise increase substantially in proportion to the square of the rotary speed. Therefore, the spring 71 will be further compressed assuming that the anvil 72 is kept at rest. As a result, the vanes 66 will be somewhat adjusted in the direction of flow so that a new balance will be reached when the braking couple has increased less than in proportion to the square of the speed. A depression of the pedal 75 increases the braking couple.

From the foregoing description of the two embodiments illustrated in Figs. 1, 2 and in Figs. 3, 4 it will be readily understood that the hydrodynamic forces acting upon the guide vanes may either be used directly for the adjustment thereof as explained with reference to Figs. 3 and 4, or may be indirectly used for such adjustment by the provision of a rotary support for the adjustable guide vanes, such support being rotatable about the axis of the hydrodynamic device. In the latter alternative, the reactionary couple exerted upon such support during the braking function is made use of for adjusting the brakes. This embodiment of the present invention is of particular usefulness for a hydrodynamic device adapted for optional operation either as a brake or as a torque converter or as a hydrodynamic coupling. When used as a brake, the adjustable guide vanes of the guide vane support constituting the reactionary member serve to control the braking couple produced. Preferably, the guide vane support is adapted to be connected by a friction brake for common rotation with a swingable member mounted to oscillate about the main shaft of the hydrodynamic device, such brake including preferably a brake band. The swingable member braced against the foundation by a spring is operative to adjust the guide vanes owing to its rocking motion relative to the foundation, suitable motion-transmitting means being provided between such rocking member and the guide vanes. Hence, it will appear that the braking couple is varied by an alteration of the position of the vanes, the forces exerted by the circulating liquid upon the vanes being utilized to adjust the vanes.

While we have described our invention with reference to two preferred embodiments thereof, we wish it to be clearly understood that the same is in no way limited to the details of such embodiments, but is capable of numerous modifications within the scope of the appended claims.

What we claim is:

1. A hydrodynamic device adapted to operate as a brake comprising a shaft to be braked, a first element having vanes and fixed to said shaft, fluid conducting means including a second element operatively associated with said first element for conducting a circulating liquid into engagement with said vanes and providing liquid circulating drag useful as a braking force, a set of guide vanes through which liquid is transferred between the vanes of the first element and said second element, support means in said hydrodynamic device, means for pivotally mounting said guide vanes on said support means in operative engagement with said circulating liquid to provide for adjustment of the braking couple exerted by said liquid upon said first element, and automatic adjusting means operatively connected with said guide vanes for automatically adjusting said guide vanes in response to the forces exerted by said circulating liquid upon said guide vanes in response to increased rotational speed to thereby provide increasing braking, but effectively relatively reduce the braking couple with respect to the braking couple that would be produced by a corresponding increase in rotational speed with no adjustment of said guide vanes and with an increase in said forces.

2. A hydrodynamic device adapted to operate as a brake comprising a shaft to be braked, a first element having vanes and fixed to said shaft, fluid conducting means including a second element operatively associated with said first element for conducting a circulating liquid into engagement with said vanes and providing liquid circulating drag useful as a braking force, a set of guide vanes through which liquid is transferred between the vanes of the first element and said second element, support means in said hydrodynamic device, means for pivotally mounting said guide vanes on said support means in operative engagement with said circulating liquid to provide adjustment of the braking couple exerted by said liquid upon said first element, a common adjusting member operatively connected with said guide vanes to adjust the same, a swingable member operatively connected with said support means and swinging in response to forces exerted by the impelled liquid upon said guide vanes and said support means, and an element operatively connected with both said swingable member and said adjusting member to adjust said guide vanes by the effect of the forces exerted by said circulating liquid upon said guide vanes in response to increased rotational speed to thereby provide increasing braking, but effectively relatively reduce the braking couple with respect to the braking couple that would be produced by a corresponding increase in rotational speed with no adjustment of said guide vanes and with an increase in said forces.

3. A hydrodynamic device according to claim 1, further comprising optionally operable means for selectively rendering said adjusting means operative and inoperative, said guide vanes being operative for self adjustment to a non-braking condition with said adjusting means inoperative.

4. A hydrodynamic device according to claim 2, further comprising disengageable means to connect said support means with said swingable member and to enable said support means to rotate freely in a non-braking condition when disengaged.

5. A hydrodynamic device adapted to operate as a brake and having a relatively stationary part, comprising a shaft to be braked, a first element having vanes and fixed to said shaft, fluid conducting means including a second element operatively associated with said first element for conducting a circulating liquid into engagement with said vanes and providing liquid circulating drag useful as a brake force, a set of guide vanes through which liquid is transferred between the vanes of the first element and said second element, support means in said hydrodynamic device, means for pivotally mounting said guide vanes on said support means in operative engagement with said circulating liquid to provide adjustment of the braking couple exerted by said liquid upon said first element, a common adjusting member operatively connected with said guide vanes to adjust the same, a swingable member rotatably mounted on said support means, disengageable friction means for selectively connecting said support means with said swingable member, a spring bracing said swingable member against said relatively stationary part in opposition to the reaction couple exerted by the impelled liquid upon said guide vanes and said support means and transferred by said disengageable means to said swingable member, an element operatively connected with both said swingable member and said adjusting member to provide adjustment of said guide vanes by said swingable member, and optionally operable means for selectively engaging said friction means and to bias said spring in dependence on its operation to thereby render said hydrodynamic brake effective and determine the braking couple produced thereby.

6. A hydrodynamic device adapted to operate as a brake and having a relatively stationary part, comprising a shaft to be braked, a first element having vanes and fixed to said shaft, fluid conducting means including a second element operatively associated with said first element for conducting a circulating liquid into engagement with said vanes and providing liquid circulating drag useful as a brake force, a set of guide vanes through which liquid is transferred between the vanes of the first element and said second element, support means in said hydrodynamic device, means for pivotally mounting said guide vanes on said support means in operative engagement with said circulating liquid to provide adjustment of the braking couple exerted by said liquid upon said first element, a common adjusting member mounted on said support means and connected with said guide vanes and provided with a cam slot, a swingable member rotatably mounted about said support means, disengageable friction means for selectively connecting said support means to said swingable member, a spring bracing said swingable member against said relatively stationary part to oppose the reaction couple exerted by the impelled liquid upon said guide vanes and said support means and transferred by said friction means to said swingable member, a sleeve surrounding said shaft and having a stud engaging said cam slot, a bell crank mounted on said relatively stationary part and operatively connected with said swingable member and said sleeve to actuate the latter by the former, said adjusting member, said support means, said sleeve and said shaft being mounted in nested relationship, a brake pedal, means operatively connected with said brake pedal to bias said spring, and means operated by said brake pedal for engaging said friction means.

7. A hydrodynamic torque convertor comprising a driving shaft and a driven shaft, a primary element fixed to said driving shaft, a secondary element fixed to said driven shaft, both said elements being provided with vanes shaped to cooperate for providing a circulation of liquid into an impelling engagement with said vanes, rotary support means mounted coaxially with said shafts for rotation independently thereof, a set of guide vanes, means pivotally mounting said guide vanes on said support means in operative engagement with said circulating liquid, a swingable member operatively connected with said support means and swinging in response to forces exerted by the impelled liquid upon said guide vanes and said support means during a braking operation, and an element operatively connected with both said swingable member and said guide vanes for adjusting said guide vanes by said swingable member under the effect of the forces exerted by said circulating liquid upon said guide vanes to thereby effectively reduce the braking couple with an increase in said forces.

References Cited in the file of this patent

UNITED STATES PATENTS

| | | |
|---|---|---|
| 2,015,212 | Beaumont | Sept. 24, 1935 |
| 2,162,543 | Banner | June 13, 1939 |
| 2,187,937 | Sensaud de Lavaud | Jan. 23, 1940 |
| 2,250,702 | Canaan | July 29, 1941 |
| 2,349,921 | Wemp | May 30, 1944 |
| 2,491,329 | O'Leary | Dec. 13, 1949 |

FOREIGN PATENTS

| | | |
|---|---|---|
| 18,586 | Great Britain | Aug. 13, 1912 |
| 425,538 | Great Britain | Mar. 18, 1935 |
| 444,171 | Great Britain | Mar. 16, 1936 |
| 589,790 | Great Britain | June 30, 1947 |